United States Patent
Phillips

(10) Patent No.: US 7,896,233 B2
(45) Date of Patent: Mar. 1, 2011

(54) METHODS AND APPARATUS FOR PERSONALIZING MERCHANT DEVICE FOR RECEIVING CONTACTLESS PAYMENTS

(75) Inventor: Simon Phillips, York (GB)

(73) Assignee: MasterCard International, Inc., Purchase, NY (US)

(*) Notice: Subject to any disclaimer, the term of this patent is extended or adjusted under 35 U.S.C. 154(b) by 173 days.

(21) Appl. No.: 12/031,317

(22) Filed: Feb. 14, 2008

(65) Prior Publication Data

US 2009/0166420 A1    Jul. 2, 2009

Related U.S. Application Data

(60) Provisional application No. 61/016,865, filed on Dec. 27, 2007.

(51) Int. Cl.
  *G06Q 40/00*    (2006.01)
(52) U.S. Cl. ...................................................... 235/379

(58) Field of Classification Search ................. 235/379, 235/380, 382
See application file for complete search history.

(56) References Cited

U.S. PATENT DOCUMENTS

| | | | |
|---|---|---|---|
| 4,809,326 A * | 2/1989 | Shigenaga | 705/73 |
| 5,847,373 A * | 12/1998 | Catte | 235/492 |
| 6,694,300 B1 * | 2/2004 | Walker et al. | 705/14.25 |
| 7,353,991 B2 * | 4/2008 | Esplin et al. | 235/383 |
| 2004/0050932 A1 * | 3/2004 | Fukada et al. | 235/380 |
| 2007/0262134 A1 * | 11/2007 | Humphrey et al. | 235/379 |

* cited by examiner

*Primary Examiner*—Jamara A Franklin
(74) *Attorney, Agent, or Firm*—Buckley, Maschoff & Talwalkar LLC

(57) ABSTRACT

A method includes receiving a contactless smart card. The method further includes bringing the contactless smart card into proximity with a merchant device so as to transfer information from the contactless smart card to the merchant device. The transferred information enables the merchant device to receive contactless payments.

18 Claims, 3 Drawing Sheets

METHODS AND APPARATUS FOR PERSONALIZING MERCHANT DEVICE FOR RECEIVING CONTACTLESS PAYMENTS

CROSS-REFERENCE TO RELATED APPLICATION

This application claims the benefit of U.S. provisional patent application No. 61/016,865, filed Dec. 27, 2007, which is incorporated herein by reference.

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal.

In pursuit of still greater convenience and more rapid transactions at POS terminals, payment cards have more recently been developed that allow the account number to be automatically read from the card by radio frequency communication between the card and a so-called "proximity reader" which may be incorporated with the POS terminal. In such cards, often referred to as "proximity payment cards" or "contactless payment cards", a radio frequency identification (RFID) integrated circuit (IC, often referred to as a "chip") is embedded in the card body. A suitable antenna is also embedded in the card body and is connected to the RFID chip to allow the chip to receive and transmit data by RF communication via the antenna. In typical arrangements, the RFID chip is powered from an interrogation signal that is transmitted by the proximity reader and received by the card antenna when the card is brought close to (typically tapped against) the proximity reader.

MasterCard International Incorporated, the assignee hereof, has established a widely-used standard, known as "PayPass", for interoperability of contactless payment cards and proximity readers.

Contactless payment functionality may be incorporated in other devices besides cards. Such other devices include key fobs, wristwatches, wristbands, and mobile telephones.

It has been proposed that at least some of the capabilities of a POS terminal/proximity reader be incorporated into a mobile telephone, thereby turning the mobile telephone into a merchant device that is able to receive contactless payments from a contactless payment card or from another mobile device that incorporates contactless payment functionality. A merchant device may, for example, be useful for merchants who have a low volume of transactions, or for those, such as a flea market seller, itinerant merchant, taxi driver, etc., who do not have a fixed store location. In mobile-to-mobile transactions, or when a contactless payment card is presented to a merchant device, the latter device plays the part of the proximity reader, and receives the customer's payment card account number from the customer's card or device via wireless communication. The merchant device then initiates an authorization request for a purchase transaction to an acquirer financial institution that is part of a conventional payment system. The merchant device may do so by using the conventional mobile telephone network. After the payment system routes the authorization request to the financial institution that issued the customer's payment card account, a response to the authorization request is returned to the merchant device, and the transaction may be consummated in a similar manner to a transaction which occurs via contactless payment at a POS terminal.

One issue that exists with respect to mobile merchant devices is how to load such devices with merchant-and/or acquirer-specific information required to set up the devices for operation as described above. Loading of a suitable application program into the merchant device may also be necessary. It may be inconvenient or infeasible to load such a program or specific information at the factory or at a mobile telephone store upon the merchant's acquisition of the mobile device. It may also be contemplated to load the programming or specific information into the mobile device "over-the-air" ('OTA') via the mobile network, but the necessary computer infrastructure may be expensive and may take a considerable period of time to establish.

DETAILED DESCRIPTION

In general, a contactless smart card is loaded with an application program and/or merchant-and/or acquirer-specific information and is then sent to the merchant. The merchant presents the smart card to a mobile phone or other device that is owned by the merchant and that has short range communication capability such as NFC. The smart card and the mobile phone engage in wireless communication such that the mobile phone is set up to operate as a merchant device that receives contactless payments.

Figure 1:
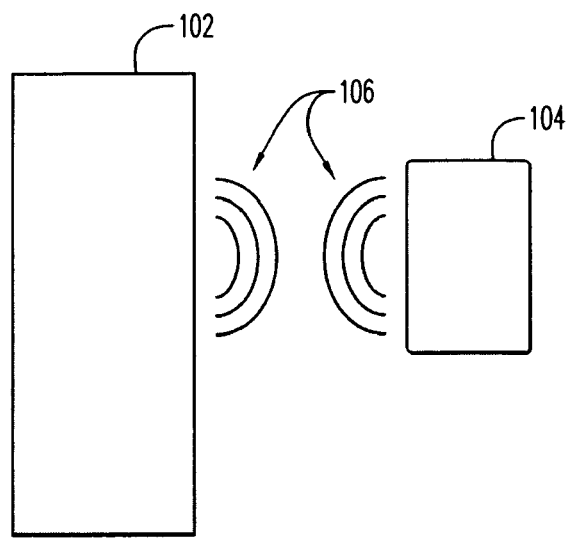
FIG. 1 schematically illustrates personalization of a merchant device, according to some embodiments, by using a suitably programmed contactless smart card.

FIG. 1 schematically illustrates personalization of a merchant device 102, according to some embodiments, by using a suitably programmed contactless smart card 104. Both the merchant device 102 and the contactless smart card 104 may be conventional in terms of their hardware aspects. For example, the merchant device 102 may be a conventional mobile telephone with NFC (Near Field Communication) functionality. The contactless smart card 104 may be passive in the sense that it is powered entirely from an interrogation signal from another device (in this instance, from the merchant device 102). Some details of the contactless smart card 104 will be described below with reference to FIG. 2. An exchange of wireless communication between the merchant device 102 and the contactless smart card 104 is indicated at 106.

Figure 2:
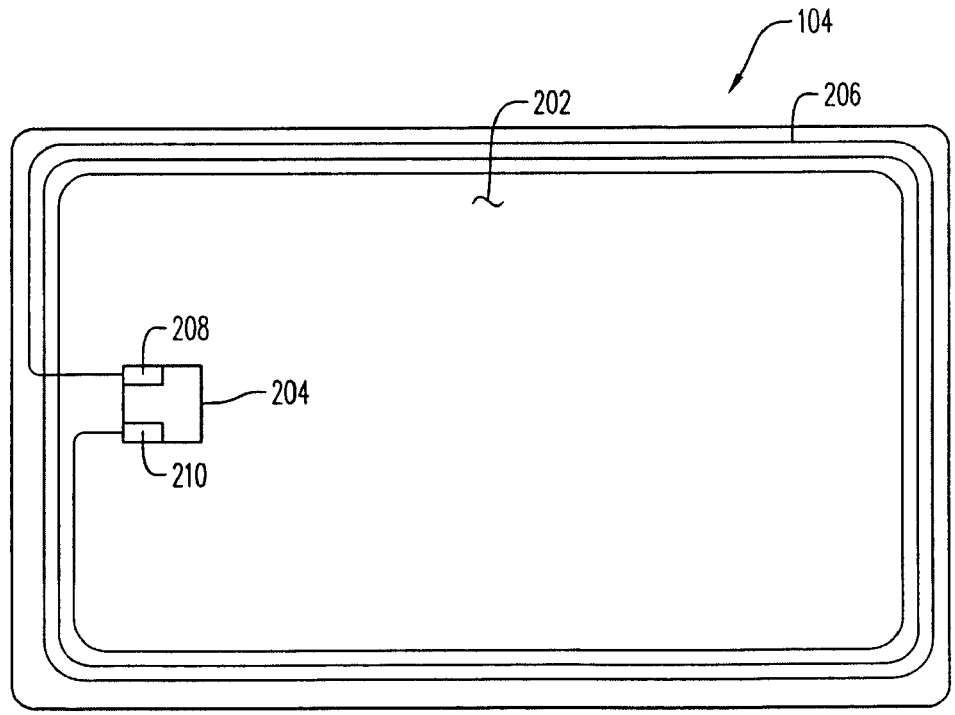
FIG. 2 is a schematic plan view of the contactless smart card shown in FIG. 1.

FIG. 2 is a schematic plan view of the contactless smart card 104. In some embodiments, the contactless smart card 104 may be the same, in terms of its hardware, as a conventional contactless payment card. For example, the contactless smart card 104 may include a card-shaped plastic body 202. The contactless smart card 104 may further include an integrated circuit (IC) 204 embedded in and/or supported by the plastic body 202. In addition, the contactless smart card 104 may include an antenna 206 that is coupled to the IC 204 and is embedded in and/or supported by the plastic body 202. For example, the antenna 206 may be coupled to the IC 204 at terminals 208, 210 on the IC 204.

As seen from the example embodiment shown in FIG. 2, the antenna 206 may be a loop antenna consisting of a few turns of a conductive material.

The IC 204 may include a control/data storage portion (not separately shown) and transmit/receive circuitry (not separately shown) by which the IC 204 may transmit and/or receive communications via the antenna 206. The transmit/receive circuitry may for example operate in accordance with an NFC standard.

Also not separately shown, but included in the IC 204, is circuitry that supplies power for the IC 204 from an interrogation signal received via the antenna 206. The contactless smart card 104 may be "passive" in the sense that it derives all of its power needs from the interrogation signal, and is inactive when not being interrogated or otherwise supplied with a power signal. Thus, in a preferred embodiment, the contactless smart card 104 does not include a battery.

The control/data storage portion of the IC 204 may store one or more application programs, and data, required to be wirelessly transferred to the merchant device 102 to enable the merchant device 102 to receive contactless payments. The control/data storage portion of the IC 204 may in some embodiments substantially function as a microcontroller, or may alternatively be a simpler device that responds to interrogation signals by transmitting information stored in the control/data storage portion.

The functionality ascribed herein to the IC 204 may alternatively be embodied in a chip set, rather than in a single IC.

The card-shaped plastic body 202 may be of any convenient size, but preferably has the same dimensions as a standard identification card format such as the commonly used ID-1 standard format. Providing the contactless smart card 104 in such a standard form factor may facilitate loading of the required information into the contactless smart card 104 by use of conventional personalization equipment, such as the Model 9000 available from Datacard Group, Minnetonka, Minn.

Figure 3:
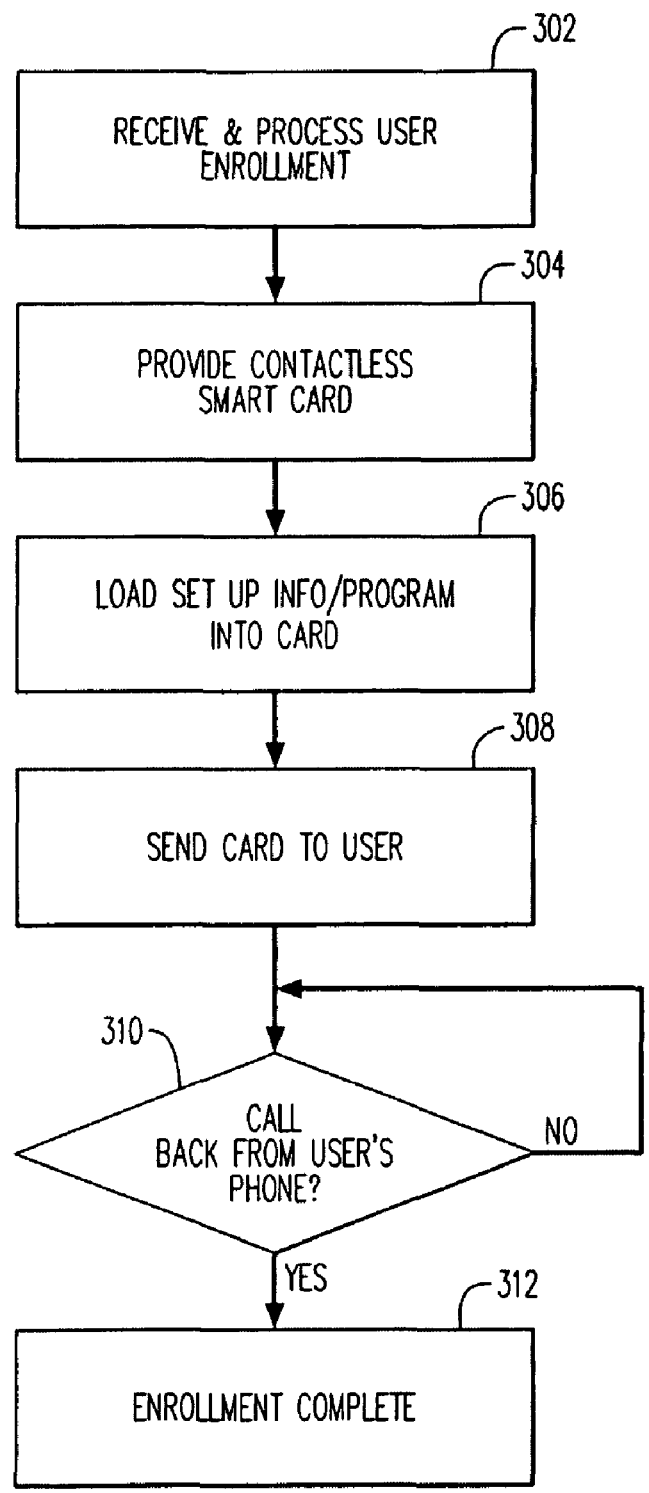
FIG. 3 is a flow chart that illustrates a process for loading the smart card of FIG. 2 with information and/or programs required for the personalization process illustrated in FIG. 1.

FIG. 3 is a flow chart that illustrates a process for loading the contactless smart card 104 with information and/or programs required for the personalization process illustrated in FIG. 1.

At 302 in FIG. 3, a financial institution (or a contractor or service provider acting on behalf of the financial institution) may receive an application from a merchant to enroll the merchant's mobile device 102 as a device that receives contactless payments. The financial institution may already act, pursuant to a pre-existing relationship with the merchant, as an acquirer for purchase transactions initiated by the merchant. Alternatively, the merchant-acquirer relationship may be established as part of the enrollment process. In at least some cases, the enrollment process may be conducted online, with the merchant accessing a website maintained by or on behalf of the financial institution. The merchant may enter identifying information such as name and address, etc., and/or may enter a merchant identifier by which the financial institution already knows the merchant. The merchant may also enter, e.g., a mobile telephone number assigned to the merchant device 102, or another type of data that uniquely identifies the merchant device 102.

At 304 in FIG. 3, the financial institution, or more likely a service provider hired by the financial institution, makes available for processing a "blank" contactless smart card like the card 104 described above. Then, at 306, information and/or programs are loaded into the contactless smart card 104, preferably by using automated equipment such as the above-mentioned personalization equipment. In some embodiments, step 306 includes two or more stages, roughly corresponding to pre-personalization and personalization as applied to contactless payment cards. That is, in a first batch mode, programs, data, etc. to be loaded into every card in the batch are loaded by wireless transmission into the contactless smart card 104. Then, in a second batch mode, merchant-specific information, such as a merchant identifier and one or more encryption keys, may be loaded into each card, again by wireless transmission. In the first batch mode, for example, two application programs may be loaded, one to control the contactless smart card 104 in its subsequent interaction with the merchant device 102, and a second application program to be downloaded to the merchant device 102 from the contactless smart card 104 to control the merchant device 102 in its operations for receiving contactless payments. The first batch mode may also include addressing information to be used by the merchant device in transmitting transaction authorization requests to the financial institution in connection with receiving contactless payments. The addressing information may be, for example, a telephone number for a call-in system operated by or on behalf of the financial institution, or a web address of a website at which the financial institution receives transaction authorization requests.

The card-specific information, loaded into the contactless smart card 104, as part of a batch process (for example) at step 306, may have previously been downloaded from the financial institution to the service provider, to be fed to the personalization equipment, and may be derived from a batch of merchant and/or merchant device enrollment information received from various merchants in various instances of step 302.

At 308 in FIG. 3, the service provider mails the now-personalized contactless smart card 104 to the merchant who enrolled at 302.

Next, at 310 in FIG. 3, it is determined whether the merchant device has phoned in to a financial institution computer to confirm that the merchant device has been personalized through interaction with the contactless smart card 104. Once such a phone call has occurred, then step 312 follows. At step 312, the financial institution considers the merchant device 102 identified at 302 to be fully enrolled, and is prepared to accept authorization requests from the merchant device 102.

Figure 4:
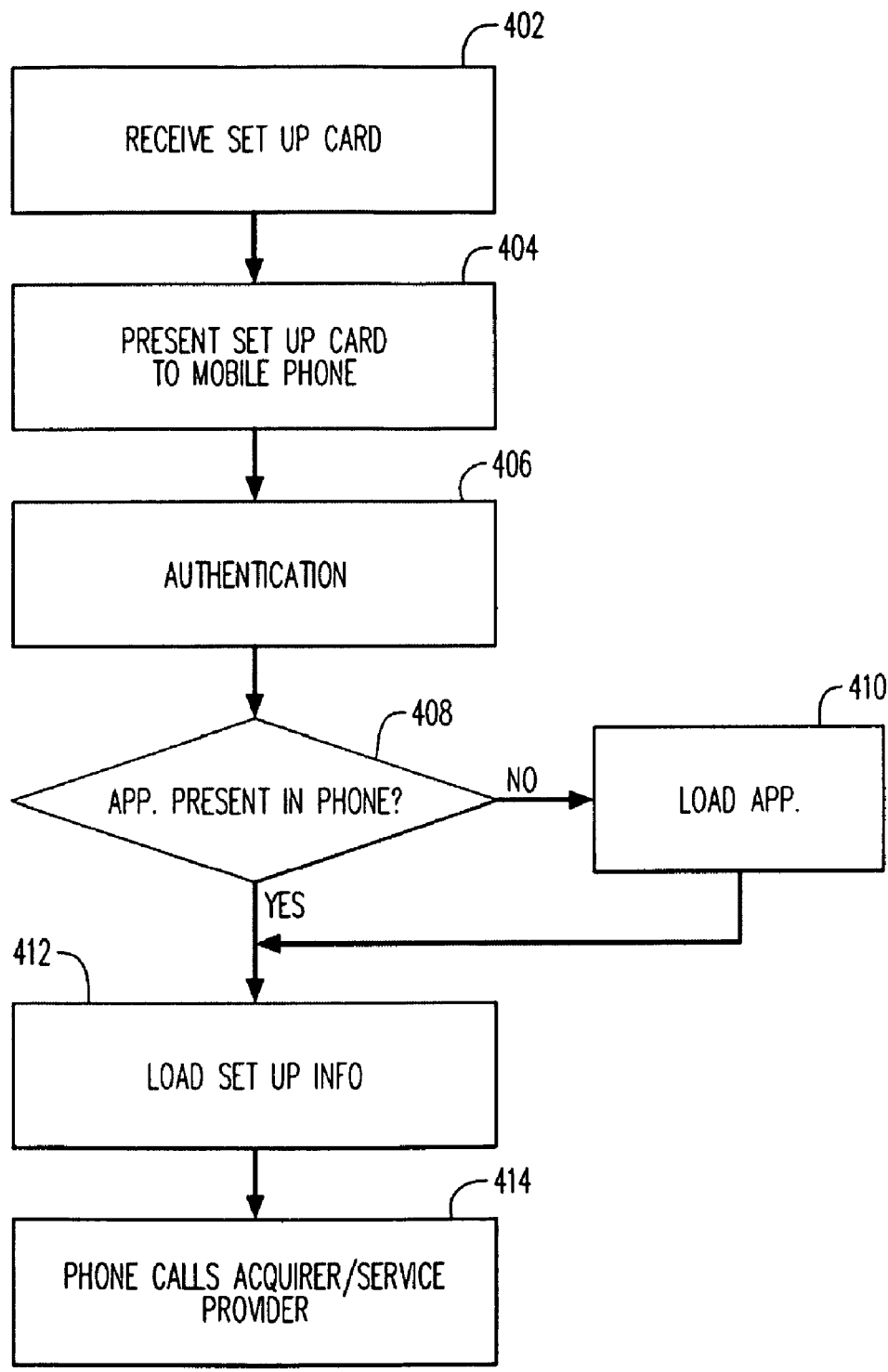
FIG. 4 is a flow chart illustration of the personalization process shown in FIG. 1.

FIG. 4 is a flow chart illustration of the personalization process shown in FIG. 1.

At 402 in FIG. 4, the merchant receives the contactless smart card 104 that was loaded with information specific to the merchant in the process of FIG. 3.

At 404, the merchant presents the contactless smart card 104 to the merchant device 102 in such a manner that an exchange of wireless communications takes place between the contactless smart card 104 and the merchant device 102. For example, the merchant may hold the contactless smart card 104 against the merchant device 102. In other words, the merchant brings the contactless smart card 104 into proximity with the merchant device so that information is transferred from the contactless smart card 104 to the merchant device 102. The wireless communication may, for example, be in accordance with an NFC standard.

At 406, via the exchange of communications between the contactless smart card 104 and the merchant device 102, a procedure may occur in which at least one of the contactless smart card 104 and the merchant device 102 is authenticated. That is, one or both of the contactless smart card 104 and the merchant device 102 may inquire of the other device for information that establishes that the other device is authentic. For example, the contactless smart card 104 may query the merchant device 102 for information which identifies the merchant device, and the contactless smart card 104 may compare that information with information which was originally entered by the merchant during enrollment (step 302, FIG. 3) and subsequently loaded into the contactless smart card 104 (step 306, FIG. 3). Alternatively, the authentication procedure may involve prompting the user to enter into the merchant device an authentication code that was previously disclosed to the user during the enrollment process.

At 408, the contactless smart card 104 may determine whether the merchant device 102 has stored therein an application program for controlling the merchant device 102 in connection with receiving contactless payments. For example, the contactless smart card 104 may query the merchant device 102 as to whether the merchant device 102 has the necessary application program stored therein. (This inquiry may also include inquiring whether the application program, if present, is an up-to-date version of the program.) If the contactless smart card 104 determines that the required application program is not already stored in the merchant device (or, if stored in the merchant device, is not up-to-date), then step 410 follows decision block 408. At step 410, the contactless smart card 104, via wireless communication with the merchant device 102, loads the required application program into the merchant device 102.

However, if at 408 the contactless smart card 104 determines that the required application program is already stored in the merchant device 102, then step 412 may immediately follow 408. (Alternatively, step 412 may follow step 410.) At 412 the contactless smart card 104, via wireless communication with the merchant device 102, loads set up information into the merchant device 102. This information may include information that was loaded into the contactless smart card 104 at 306 (FIG. 3), such as (a) a merchant identifying code by which the merchant is, or is to be, identified to the acquirer financial institution; (b) addressing information which the merchant device 102 is to use to route transaction authorization requests to the acquirer financial institution; and (c) one or more encryption keys (used for data communication security and/or authentication purposes, and hence referred to as "security keys") for use in communications between the acquirer financial institution and the merchant device 102.

Once the loading of the information from the contactless smart card 104 to the merchant device 102 is complete, and the merchant device is thereby enabled to receive contactless payments from contactless payment cards, from mobile telephones with contactless payment functionality, etc., then step 414 may follow step 412. At 414, the merchant device 102 may telephone in to a system operated by or on behalf of the financial institution to report that personalization of the merchant device 102 has occurred. This, in turn, may trigger the financial institution to recognize (step 312, FIG. 3) that enrollment of the merchant and/or his/her merchant device 102 is complete. The phone call from the merchant device 102 to the financial institution to report personalization of the merchant device 102 may occur automatically, or may alternatively be initiated in response to input from the user of the merchant device 102.

By leveraging on the existing infrastructure for personalizing contactless payment cards, and avoiding the need to establish a complex OTA personalization system, the above-described card-based personalization technique for merchant devices may provide the advantage of being rather inexpensive to implement, with a short time-to-market. Further, the card-based personalization technique may avoid security issues that may be present with a network-based personalization system.

It will be noted that the process of FIG. 4 is different from that involved in a purchase transaction. While both entail wireless communication between a contactless smart card and the merchant device, in the purchase transaction the smart card transmits a payment card account number to the merchant device, and this typically does not occur in the process of FIG. 4.

Up to this point, the merchant device 102 has generally been portrayed as being a mobile telephone. Alternatively, however, the merchant device may be a PDA (personal digital assistant) that has mobile communication and NFC (or the like) capability, or a BlackBerry. As another alternative, the merchant device 102 may be a POS terminal that includes a proximity reader. The POS terminal thus may be set up (or updated) for purposes of receiving contactless payments with data and/or software loaded into the POS terminal via its proximity reader from a contactless smart card.

In some embodiments, the contactless smart card used for personalizing the merchant device may be reusable for the purpose of setting up several merchant devices, with a respective merchant/device ID and a separate set of keys being loaded into each merchant device and accessed by entering a respective different access code with respect to setting up each merchant device.

In other embodiments, each set up of a merchant device may expire after a period of time, and the same contactless smart card may be used to renew the set up of the merchant device, with entry of a new access code each time, and a new set of identifiers/security keys being loaded into the merchant device each time.

In some embodiments, a merchant device, whether set up via a contactless smart card or in another way, may insert information into the discretionary data field of one or more transaction authorization requests so as to report a result of the set up operation, and/or other information, to the acquirer financial institution and/or to a service provider.

In some embodiments, a contactless smart card may be used to set up reading devices other than merchant devices. Examples of such readers may be devices that read contactless smart card transportation tickets, medical record smart cards, and so forth.

As used herein and in the appended claims, the term "contactless smart card" refers both to smart cards that communicate only wirelessly, and to so-called dual use smart cards that can be read either wirelessly or via contacts on the face of the card. "Contactless payments" should be understood to include both conventional payment card system purchase transactions using a contactless payment card or other contactless payment device, as well as mobile to mobile transactions—of a type described in commonly assigned provisional patent application Ser. No. 60/977,260 (filed Oct. 3, 2007; entitled "System for Personalized Payments Via Mobile Devices")—in which the customer pays for a transaction by initiating a payment transaction in a payment card system using the customer's mobile device.

The above description and/or the accompanying drawings are not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:

receiving a contactless smart card; and bringing the contactless smart card into proximity with a merchant device so as to transfer information from the contactless smart card to the merchant device, the transferred information enabling the merchant device to receive contactless payments;

wherein the information transferred from the contactless smart card to the merchant device is for use in subsequent communications from the merchant device to an acquirer financial institution and includes information that identifies, to the acquirer financial institution in said subsequent communications, a merchant that owns and operates the merchant device.

2. The method of claim 1, wherein the information transferred from the contactless smart card to the merchant device includes at least one security key.

3. The method of claim 1, wherein the contactless smart card does not include a battery.

4. The method of claim 1, wherein the information transferred from the contactless smart card to the merchant device includes addressing information for sending an authorization request for a purchase transaction to the acquirer financial institution.

5. The method of claim 4, wherein the addressing information includes a call-in telephone number for a system operated by or on behalf of the acquirer financial institution.

6. The method of claim 4, wherein the addressing information includes a web address of a website at which the acquirer financial institution receives transaction authorization requests.

7. The method of claim 1, wherein the information transferred from the contactless smart card to the merchant device includes at least one security key.

8. A contactless smart card, comprising:

a card body;

at least one integrated circuit supported by the card body; and an antenna supported by the card body and coupled to the at least one integrated circuit for allowing the at least one integrated circuit to transmit information via the antenna;

the at least one integrated circuit storing information suitable for wireless transfer to a merchant device for enabling the merchant device to receive contactless payments;

wherein the stored information includes information that identifies, to an acquirer financial institution, a merchant that operates the merchant device.

9. The contactless smart card of claim 8, wherein the stored information includes at least one security key.

10. The contactless smart card of claim 8, wherein the at least one integrated circuit stores an application program suitable for loading into the merchant device.

11. The contactless smart card of claim 8, wherein the contactless smart card does not include a battery.

12. The contactless smart card of claim 8, wherein the stored information includes addressing information for sending an authorization request for a purchase transaction to an the acquirer financial institution.

13. A method comprising:

providing a contactless smart card; and loading information into the contactless smart card, the information being suitable for wireless transfer to a merchant device for enabling the merchant device to receive contactless payments;

wherein the information includes information that identifies, to an acquirer financial institution, a merchant that operates the merchant device.

14. The method of claim 13, wherein the information includes at least one security key.

15. The method of claim 13, further comprising:

loading an application program into the contactless smart card, the application program suitable for loading into the merchant device.

16. The method of claim 13, wherein the information includes addressing information for sending an authorization request for a purchase transaction to the acquirer financial institution.

17. The method of claim 16, wherein the addressing information includes a call-in telephone number for a system operated by or on behalf of the acquirer financial institution.

18. The method of claim 16, wherein the addressing information includes a web address of a website at which the acquirer financial institution receives transaction authorization requests.

* * * * *